(12) United States Patent
Cui

(10) Patent No.: US 12,154,370 B2
(45) Date of Patent: Nov. 26, 2024

(54) LIGHT SPOT DISPLAY METHOD AND APPARATUS

(71) Applicant: Honor Device Co., Ltd., Shenzhen (CN)

(72) Inventor: Chuang Cui, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/800,820

(22) PCT Filed: Jan. 21, 2022

(86) PCT No.: PCT/CN2022/073125
§ 371 (c)(1),
(2) Date: Dec. 22, 2022

(87) PCT Pub. No.: WO2022/262277
PCT Pub. Date: Dec. 22, 2022

(65) Prior Publication Data
US 2024/0221419 A1    Jul. 4, 2024

(30) Foreign Application Priority Data

Jun. 15, 2021  (CN) ......................... 202110661035.X
Jul. 29, 2021  (CN) ......................... 202110866233.X

(51) Int. Cl.
G09G 3/20       (2006.01)
G06F 3/042      (2006.01)
(Continued)

(52) U.S. Cl.
CPC .......... G06V 40/1318 (2022.01); G06F 3/042 (2013.01); G09G 3/2096 (2013.01);
(Continued)

(58) Field of Classification Search
CPC ...... G06F 3/0412; G06F 3/042; G06F 3/0481; G06F 3/0484; G06F 3/0487;
(Continued)

(56) References Cited

U.S. PATENT DOCUMENTS 11,232,282 B2    1/2022  Cheng
2004/0017383 A1*  1/2004  Baer ..................... G09G 5/005
                                                345/629
(Continued)

FOREIGN PATENT DOCUMENTS

CN    108510962 A    9/2018
CN    109643379 A    4/2019
(Continued)

OTHER PUBLICATIONS

English translation of WO-2021237521-A1 (Year: 2021).*

*Primary Examiner* — Nathan Danielsen
(74) *Attorney, Agent, or Firm* — Leydig, Voit & Mayer, Ltd.

(57) ABSTRACT

A light spot display method and an apparatus are disclosed. After a fingerprint event in a fingerprint detection area is detected, a light spot drawing instruction is generated, and a light spot is drawn in response to the light spot drawing instruction to obtain light spot display data, and fingerprint scenario marking information and the light spot display data are simultaneously sent, so as to ensure that a display driver synchronously receives the fingerprint scenario marking information and the light spot display data. This solution reduces the time consumed in the light spot display process, that is, increases the light spot display speed. The fingerprint image can be obtained and the fingerprint can be recognized only after the light spot is normally displayed. Therefore, this solution increases the speed of responding to a finger- (Continued)

print event, and then reduces the time consumed in the entire fingerprint recognition process.

16 Claims, 8 Drawing Sheets

(51) Int. Cl.
    *G06V 40/13* (2022.01)
    *G09G 5/36* (2006.01)

(52) U.S. Cl.
    CPC ....... *G09G 5/36* (2013.01); *G09G 2320/0626* (2013.01); *G09G 2354/00* (2013.01); *G09G 2370/00* (2013.01)

(58) Field of Classification Search
    CPC . G06F 3/0488; G06F 3/04886; G09G 3/2096; G09G 5/36–377; G09G 5/395–42; G09G 3/0626; G09G 3/0686; G09G 3/10; G09G 2354/00; G09G 2360/145–148; G09G 2370/00; G09G 2370/04; G09G 2370/08; G09G 2370/10; G09G 2370/20
    See application file for complete search history.

(56) References Cited

U.S. PATENT DOCUMENTS

| | | | |
|---|---|---|---|
| 2019/0065808 A1 | 2/2019 | Zhang et al. | |
| 2019/0197293 A1* | 6/2019 | So | G06F 3/044 |
| 2019/0370525 A1 | 12/2019 | Wang et al. | |
| 2020/0081570 A1* | 3/2020 | Suk | G06F 3/04886 |
| 2022/0036035 A1* | 2/2022 | Wu | G06F 3/0488 |
| 2022/0284686 A1 | 9/2022 | Zhang | |

FOREIGN PATENT DOCUMENTS

| | | |
|---|---|---|
| CN | 110333620 A | 10/2019 |
| CN | 110390270 A | 10/2019 |
| CN | 110785770 A | 2/2020 |
| CN | 110826438 A | 2/2020 |
| CN | 112416161 A | 2/2021 |
| CN | 113778273 A | 12/2021 |
| CN | 113778274 A | 12/2021 |
| WO | 2021056318 A1 | 4/2021 |
| WO | WO-2021237521 A1 * 12/2021 ........... G06K 9/0004 |

* cited by examiner

LIGHT SPOT DISPLAY METHOD AND APPARATUS

CROSS-REFERENCE TO RELATED APPLICATIONS

This application is a National Stage of International Application No. PCT/CN2022/073125, filed on Jan. 21, 2022, which claims priority to Chinese Patent Application No. 202110866233.X, filed on Jul. 29, 2021, and Chinese Patent Application No. 202110661035.X, filed on Jun. 15, 2021. The disclosures of each of the aforementioned applications are hereby incorporated by reference in their entireties.

TECHNICAL FIELD

This application relates to the field of optical fingerprint recognition technologies, and in particular, to a light spot display method and an apparatus.

BACKGROUND

A fingerprint recognition technology is to recognize fingerprint information by sensing and analyzing signals of valleys and ridges of fingerprints by using a fingerprint recognition module. Based on different fingerprint imaging principles, fingerprint recognition technologies currently fall into three types: capacitive fingerprint recognition, optical fingerprint recognition, and ultrasonic fingerprint recognition. The optical fingerprint recognition technology has advantages such as strong penetration capability and full screen support, and is widely used in electronic devices.

In-screen fingerprint recognition is implemented by using an optical fingerprint recognition technology. A principle is as follows: When a finger presses a touchscreen, the display forms a light spot in a fingerprint detection area, and light of the light spot passes through a glass cover and reaches a finger, and then is reflected by the finger to generate reflected light: the reflected light is different due to different tracks of the finger, and the reflected light passes through the display and is returned to a fingerprint sensor below the display: and then the fingerprint sensor obtains a fingerprint image to implement fingerprint recognition. However, in a current in-screen fingerprint recognition solution, after a fingerprint event in the fingerprint detection area is detected, a speed of responding to the fingerprint event is low:

SUMMARY

In view of this, this application provides a light spot display method and an apparatus, so as to resolve a problem that a speed of responding to a fingerprint event is low. Technical solutions disclosed in this application are as follows:

According to a first aspect, this application provides a light spot display method, applied to an electronic device, and the method includes: detecting a touch operation in a fingerprint detection area to generate a light spot drawing instruction: obtaining light spot display data in response to the light spot drawing instruction, where the light spot display data is display content data obtained by drawing a layer used to display a light spot: obtaining fingerprint scenario marking information: synchronously transmitting the light spot display data and fingerprint scenario marking information: and displaying a light spot based on the fingerprint scenario marking information and the light spot display data.

According to the light spot display method provided in this embodiment of this application, the fingerprint scenario marking information and the light spot display data are synchronously transmitted, thereby avoiding a problem that light spot display is abnormal or a light spot display delay is caused because the fingerprint scenario marking information and the light spot display data are not synchronously received. Therefore, time consumed in a light spot display process is reduced, that is, a light spot display speed is increased. In addition, the fingerprint image can be obtained and the fingerprint can be recognized only after the light spot is normally displayed. Therefore, a speed of responding to a fingerprint event is increased, and the time consumed in the entire fingerprint recognition process is reduced.

In a possible implementation, the synchronously transmitting the light spot display data and the fingerprint scenario marking information includes: simultaneously transmitting the fingerprint scenario marking information and the light spot display data through a same transmission path.

In this embodiment, the two pieces of data are simultaneously sent through the same transmission path, that is, the two pieces of data are simultaneously sent, and the two pieces of data pass through the same path. Therefore, it can be ensured that the receive end receives the two pieces of data at the same time.

In another possible implementation, the simultaneously transmitting the fingerprint scenario marking information and the light spot display data through a same transmission path includes: writing the fingerprint scenario marking information and the light spot display data into a same sending queue, and sending the data in the sending queue through the same transmission path.

In this embodiment, the light spot display data and the fingerprint scenario marking information are written into the same sending queue, and the data in the queue is sent through the same transmission path. A difference between sending times of different data in the same queue is very short and can be directly ignored. Therefore, it is considered that the transmit end simultaneously sends the two pieces of data through the same transmission path. In addition, it takes a same time for different data to be transmitted to the receive end through the same transmission path. Therefore, this embodiment can also ensure that the receive end receives the two pieces of data at the same time.

In still another possible implementation, the light spot display data includes: data of a light spot layer and data of a mask layer, where the light spot layer can transmit light of a display, and the mask layer can shield the light of the display.

In another possible implementation, the data of the light spot layer includes a position, a shape, a size, and a color of the light spot layer: the data of the mask layer includes data of a hollow area and data of a non-hollow area, the data of a hollow area includes a position, a shape, and a size of the hollow area, and the data of a non-hollow area includes a range and a color of the non-hollow area: the position, the shape, and the size of the hollow area are respectively the same as the position, the shape, and the size of the light spot layer: and a total area of the non-hollow area and the light spot layer is the same as a display area of the display.

In still another possible implementation, the fingerprint scenario marking information is used to control the display of an electronic device to enter a high brightness mode.

In another possible implementation, an operating system of the electronic device is an Android system, and the Android system includes a graphics engine and a display driver; and the synchronously transmitting the light spot display data and the fingerprint scenario marking information includes: synchronously sending, by the graphics engine, the fingerprint scenario marking information and the light spot display data to the display driver.

In still another possible implementation, the Android system further includes a graphics hardware composer, and that the graphics engine synchronously sends the fingerprint scenario marking information and the light spot display data to the display driver includes: synchronously sending, by the graphics engine, the fingerprint scenario marking information and the light spot display data to the graphics hardware composer; and synchronously sending, by the graphics hardware composer, the fingerprint scenario marking information and the light spot display data to the display driver.

In another possible implementation, the Android system further includes a fingerprint service: and the obtaining light spot display data in response to the light spot drawing instruction includes: obtaining, by the fingerprint service, the light spot data in response to the light spot drawing instruction, and drawing, based on the light spot data, a layer used to display a light spot, obtaining light spot display data, and sending the light spot display data to the graphics engine.

In another possible implementation, the synchronously sending, by the graphics engine, the fingerprint scenario marking information and the light spot display data to the graphics hardware composer includes: writing, by the graphics engine, the fingerprint scenario marking information and the light spot display data into a same sending queue, and sending the data in the sending queue to the graphics hardware composer.

In still another possible implementation, an operating system of the electronic device is an Android system, and the Android system includes a graphics engine, a graphics hardware composer, and a display driver: and the obtaining fingerprint scenario marking information includes: after receiving, by the graphics hardware composer, the light spot display data sent by the graphics engine, obtaining the fingerprint scenario marking information: and the synchronously transmitting the light spot display data and fingerprint scenario marking information includes: synchronously sending, by the graphics hardware composer, the fingerprint scenario marking information and the light spot display data to the display driver.

In this embodiment, the graphics engine needs to send only the light spot display data to the graphics hardware composer, and does not need to send the fingerprint scenario marking information. Therefore, processing logic of the graphics engine for responding to the light spot drawing instruction is simplified, thereby reducing complexity of the graphics engine.

In still another possible implementation, the synchronously sending, by the graphics hardware composer, the fingerprint scenario marking information and the light spot display data to the display driver includes: writing, by the graphics hardware composer, the fingerprint scenario marking information and the light spot display data into a same sending queue, and sending the data in the sending queue to the display driver.

In this embodiment, the light spot display data and the fingerprint scenario marking information are written into the same sending queue. Because a difference between sending times of different data in the same queue is very short and can be directly ignored. Therefore, it is considered that the transmit end simultaneously sends the two pieces of data at the same time. In addition, it takes a same time for different data to be transmitted from the graphics hardware composer to the display driver. Therefore, in this implementation, it can be ensured that the receive end simultaneously receives the two pieces of data.

According to a second aspect, this application further provides an electronic device, where the electronic device includes: one or more processors, a memory, and a touchscreen, where the memory is configured to store program code: the one or more processors are configured to run the program code, so that the electronic device performs the light spot display method according to any one of the first aspect or the possible implementations of the first aspect.

According to a third aspect, this application further provides a computer readable storage medium, where the computer readable storage medium stores an instruction, and when the instruction is run on an electronic device, the electronic device is enabled to perform the light spot display method according to any one of the first aspect or the possible implementations of the first aspect.

According to a fourth aspect, this application further provides a computer program product, where when the computer program product runs on a computer, the computer is enabled to performed the method according to any one of the first aspect or the possible implementations of the first aspect.

It should be understood that descriptions of technical features, technical solutions, beneficial effects, or similar expressions in this application are not intended to imply that all the features and advantages can be implemented in any single embodiment. On the contrary, it can be understood that descriptions of the features or beneficial effects means that specific technical features, technical solutions or beneficial effects are included in at least one embodiment. Therefore, descriptions of the technical features, technical solutions, or beneficial effects in this specification do not necessarily refer to a same embodiment. Further, the technical features, technical solutions, and beneficial effects described in the embodiments may be combined in any appropriate manner. A person skilled in the art will understand that an embodiment may be implemented without one or more specific technical features, technical solutions or beneficial effects of a specific embodiment. In other embodiments, additional technical features and beneficial effects may also be identified in specific embodiments that do not reflect all embodiments.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following descriptions merely show some embodiments of the present disclosure, and a person of ordinary skill in the art may still derive other drawings from these accompanying drawings without creative efforts.

DESCRIPTION OF EMBODIMENTS

In the specification, claims, and accompanying drawings of this application, the terms "first", "second", "third", and the like are used to distinguish between different objects, but not to limit a particular order.

In embodiments of this application, the words such as "example" or "for example" are used to indicate provision of examples, illustrations or descriptions. Any embodiment or design scheme described as "example" or "for example" in the embodiments of this application should not be interpreted as being more preferred or advantageous than other embodiments or design schemes. To be precise, the use of the word such as "example" or "for example" is intended to present a related concept in a specific manner.

For clarity and brevity of the following embodiments, a brief description of a related technology is first provided.

Figure 1:
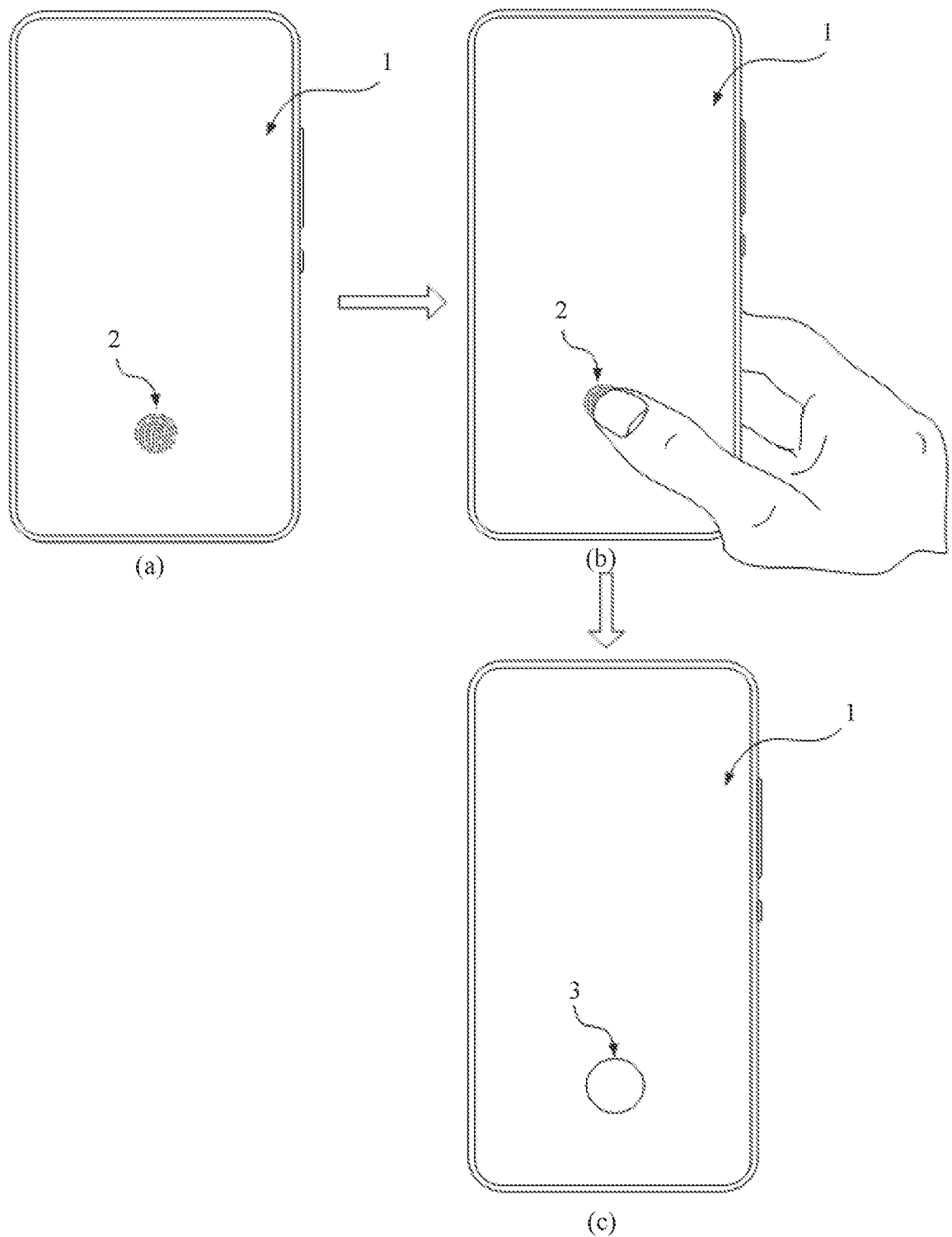
FIG. 1 is an example diagram of a light spot display process according to an embodiment of this application.

FIG. 1 is an example diagram of a light spot display process according to an embodiment of this application. In this example, an in-screen fingerprint recognition process is described by using a mobile phone as an example.

As shown in FIG. 1, a display area of a display 1 includes a fingerprint detection area 2. When a finger presses the fingerprint detection area 2, the display 1 displays a light spot 3 with sufficient brightness in the fingerprint detection area 2 (as shown in FIG. 1 (*c*)).

Figure 2:
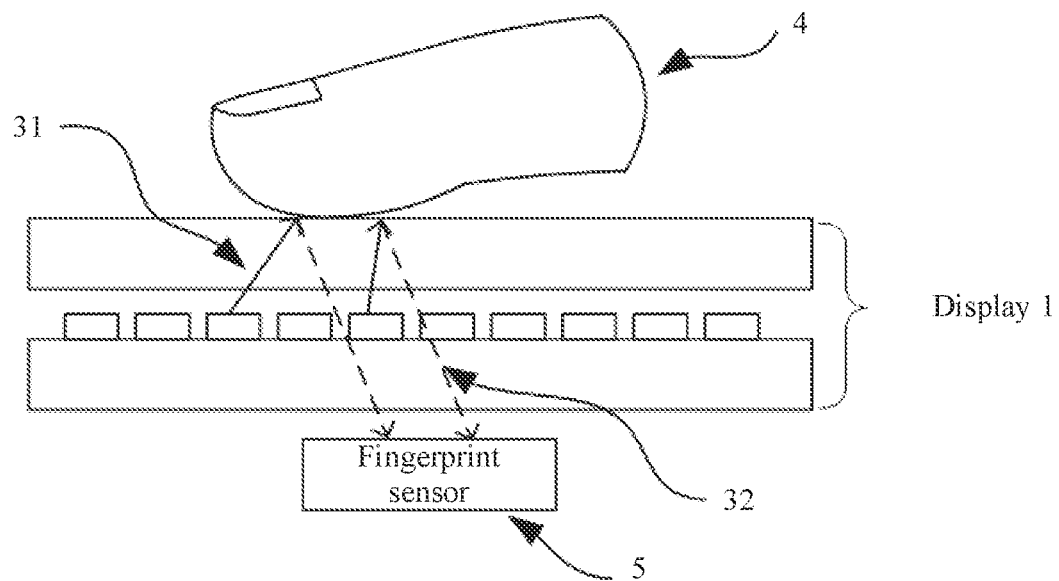
FIG. 2 is a schematic diagram of a principle of in-screen optical fingerprint recognition according to an embodiment of this application.

FIG. 2 is a schematic diagram of a principle of in-screen optical fingerprint recognition according to an embodiment of this application. As shown in FIG. 2, light 31 emitted by a light spot is reflected and scattered at a finger 4, and the light formed through reflection or scattering is generally referred to as fingerprint detection light 32, where the fingerprint detection light 32 carries fingerprint information of the finger 4. The fingerprint detection light 32 is transmitted to an optical fingerprint sensor 5 through an optical path for optical fingerprint imaging to obtain a fingerprint image, and matching verification is performed on the fingerprint image to implement an optical fingerprint recognition function.

In a process of studying this application, the inventors have found that: In a related technology, from detecting the user's operation of pressing the fingerprint detection area with a finger to obtaining a fingerprint recognition result, the entire fingerprint recognition process takes a long time. The entire fingerprint recognition process may be divided into two processes: One is to obtain a fingerprint image, and the other is to recognize a fingerprint image. In addition, time consumed for obtaining a fingerprint image process determines time consumption of an entire fingerprint recognition process. The inventors have further studied a related fingerprint recognition solution, and have found that a cause for the long duration of the fingerprint recognition process is as follows: After the user's finger presses the fingerprint detection area, a light spot display process is abnormal. For example, after the finger presses the fingerprint detection area, a light spot is displayed for a long time, or brightness of the light spot is relatively low: A light spot is used as a light source for obtaining a fingerprint image, and the fingerprint image can be obtained and a fingerprint can be recognized only after a light spot is normally displayed. If the light spot is abnormally displayed or the display process takes a long time, a process of obtaining the fingerprint image directly takes a long time, and consequently, the entire fingerprint recognition process takes a long time.

The inventors have further studied the foregoing abnormalities in the light spot display process, and have found that the cause is that the display driver does not synchronously receive the fingerprint scenario marking information and the light spot display data. Specific causes of the two abnormities are described below:

The cause for the long duration of the light spot display process is as follows: The display driver first receives the fingerprint scenario marking information, and then receives the light spot display data. In this case, after receiving the fingerprint scenario marking information, the display driver first controls the display to enter the high brightness mode. However, in this case, because the light spot display data is not received, no light spot is displayed. The light spot can be normally displayed after the light spot display data is received. That is, in this case, the display driver waits for a long time to receive the light spot display data, and consequently, the light spot display process takes a relatively long time. Further, the entire fingerprint recognition process takes a long time.

In addition, when the display driver first controls the display to enter the high brightness mode, and a phenomenon that the display is in high brightness occurs, and this phenomenon can cause damage to human eyes.

The cause for the low brightness of the light spot display is as follows: The display driver first receives the light spot display data, and then receives the fingerprint scenario marking information. In this case, the light spot can be displayed after the display driver receives the light spot display data. However, because the display driver does not receive the fingerprint scenario marking information, the display driver does not control the display to enter the high brightness mode, that is, brightness of the display is relatively low; and brightness of the light spot is also relatively low: Therefore, the fingerprint sensor cannot obtain a clear fingerprint image, and the fingerprint image cannot be used to identify the fingerprint. Therefore, the entire fingerprint recognition process takes a long time.

To resolve the foregoing technical problem, the inventors propose the light spot display method in this application. In this method, after a touch operation in a fingerprint detection area is detected, the method obtains the light spot display data and the fingerprint scenario marking information, and synchronously transmits the fingerprint scenario marking information and the light spot display data, so as to ensure that the display driver synchronously receives the fingerprint scenario marking information and the light spot display data, and the light spot is normally displayed. It can be learned from the foregoing process that, in this solution, the light spot display data and the fingerprint scenario marking information are synchronously transmitted. This avoids a problem that the light spot display process takes a long time because the display driver does not synchronously receive the fingerprint scenario marking information and the light spot display data. Therefore, time consumed in the light spot display process is reduced. In addition, the fingerprint image can be obtained and the fingerprint can be recognized only after the light spot is normally displayed. Therefore, in this solution, a speed of responding to a fingerprint event is increased, and the time consumed in the entire fingerprint recognition process is reduced.

The electronic device to which the foregoing light spot display method may be a device such as a mobile phone (as shown in FIG. 1), a tablet computer, a handheld computer, a netbook, a personal digital assistant (PDA), or a wearable electronic device. A specific form of the handheld electronic device to which the light spot display method is applied is not specifically limited in this application.

Figure 3:
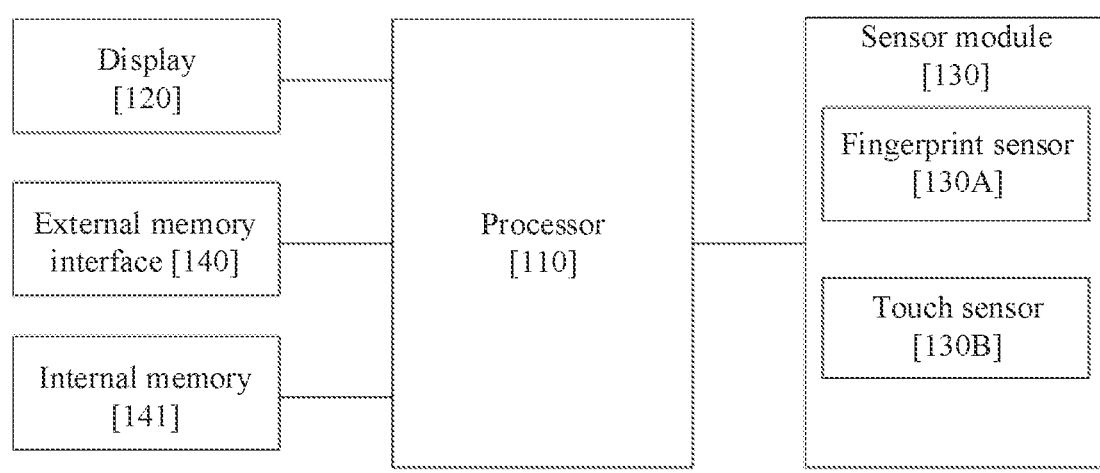
FIG. 3 is a schematic diagram of a structure of an electronic device according to an embodiment of this application.

FIG. 3 is a schematic diagram of a structure of an electronic device according to an embodiment of this application.

As shown in FIG. 3, the electronic device may include a processor 110, a display 120, a sensor module 130, an external memory interface 140, and an internal memory 141. The sensor module 130 may include a fingerprint sensor 130A, a touch sensor 130B, and the like.

It can be understood that the structure illustrated in this embodiment does not constitute a specific limitation on the electronic device. In some other embodiments, the electronic device may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may be a nerve center and a command center of the electronic device. The controller may generate an operation control signal based on an instruction operation code and a time sequence signal, so as to control instruction retrieval and instruction execution.

A memory may be further disposed in the processor 110 to store an instruction and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

In some embodiments, the processor 110 may include one or more interfaces. The interface may include an inter-integrated circuit (I2C) interface, a mobile industry processor interface (MIPI) interface, a general-purpose input/output (GPIO) interface, and the like.

The I2C interface is a bidirectional synchronous serial bus, and includes a serial data line (SDA) and a serial clock line (SCL). In some embodiments, the processor 110 may include a plurality of groups of I2C buses. The processor 110 may be separately coupled to the fingerprint sensor 130A, the touch sensor 130B, and the like by using different I2C bus interfaces. For example, the processor 110 may be coupled to the touch sensor 130B by using an I2C interface, so that the processor 110 communicates with the touch sensor 130B by using the I2C bus interface, thereby implementing a touch function of the electronic device.

The MIPI interface may be configured to connect the processor 110 to a peripheral device such as the display 120. The MIPI interface includes a display serial interface (DSI) and the like. In some embodiments, the processor 110 and the display 120 communicate by using the DSI to implement a display function of the electronic device.

The GPIO interface may be configured by using software. The GPIO interface may be configured as a control signal interface, or may be configured as a data signal interface. In some embodiments, the GPIO interface may be configured to connect the processor 110 to the display 120, the sensor module 130, and the like. The GPIO interface may be alternatively configured as an I2C interface, an I2S interface, a UART interface, an MIPI interface, or the like. The UART interface is a universal serial data bus used for asynchronous communication.

It can be understood that the interface connection relationship between the modules illustrated in the embodiments is merely an example for description, and does not constitute a limitation on the structure of the electronic device. In some other embodiments of this application, the electronic device may alternatively use an interface connection mode that is different from those in the foregoing embodiments, or use a combination of a plurality of interface connection modes.

The electronic device implements a display function by using the GPU, the display 120, the application processor, and the like. The GPU is an image processing microprocessor, which is connected to the display 120 and the application processor. The GPU is configured to perform mathematical and geometric calculations to render graphics. The processor 110 may include one or more GPUs that execute program instructions to generate or change display information.

The display 120 is configured to display an image, a video, and the like. The display 120 includes a display panel.

A series of graphical user interfaces (GUIs) may be displayed on the display 120 of the electronic device, and these GUIs are all main screens of the electronic device. Generally, a size of the display 120 of the electronic device is fixed, and only a limited quantity of controls can be displayed on the display 120 of the electronic device. A control is a GUI element. The control is a software component included in an application, and controls all data processed by the application and an interaction operation related to the data. A user may interact with the control through direct manipulation, so as to read or edit information about the application. Generally, controls may include visual interface elements such as icons, buttons, menus, tabs, text boxes, dialog boxes, status bars, navigation bars, and widgets.

For example, in this embodiment of this application, the display 120 may prompt a user with a fingerprint recognition prompt icon of the fingerprint collection area, for example, the fingerprint pattern displayed in a fingerprint recognition area 2 shown in FIG. 1 (a).

In this embodiment of this application, the display 120 needs to be used as a light source for fingerprint detection. Therefore, the display panel of the display 120 uses a self-luminous display panel, and the self-luminous display panel may control each display pixel (also referred to as a display unit) to separately emit light.

In this embodiment of this application, a display pixel in the self-luminous display is controlled to emit light with a specific brightness, so that a light spot with a specific brightness is displayed in a fingerprint detection area, and light emitted by the light spot is used as a light source for fingerprint detection.

For example, the self-luminous display may include but is not limited to: a liquid crystal display (LCD), an organic light emitting diode (OLED), an active matrix organic light emitting diode (AMOLED), a flex light emitting diode (FLED), a Miniled, a MicroLed, a Micro-oLed, quantum dot light emitting diodes (QLED), or the like. In some embodiments, the electronic device may include 1 or N displays 120, where N is a positive integer greater than 1.

The fingerprint sensor 130A is configured to collect a fingerprint. The electronic device can use the collected fingerprint characteristics to implement fingerprint-based unlocking, application lock accessing, fingerprint-based photographing, fingerprint-based incoming call receiving, and the like.

In this embodiment of this application, an in-screen fingerprint recognition technology is used, and light emitted by a light spot is used as the fingerprint detection light, and is irradiated on a finger above the display, and after the light is reflected and scattered by the finger, the fingerprint detection light that carries fingerprint information is obtained. The fingerprint detection light is transmitted through the display 120 to the fingerprint sensor 130A below the display. The fingerprint sensor 130A receives the fingerprint detection light and converts the fingerprint detection light into a corresponding electrical signal to form a fingerprint image signal.

The fingerprint sensor 130A may be an optical fingerprint sensor. The optical fingerprint sensor may be disposed below the self-luminous display, and receives the fingerprint detection light that carries the fingerprint information. The fingerprint detection light is transmitted to an optical sensing array in the optical fingerprint sensor to perform optical fingerprint imaging, and is converted into a corresponding electrical signal, that is, a fingerprint image signal.

The touch sensor 130B is also referred to as a "touch sensor panel" or a "touch device". The touch sensor 130B may be disposed on the display 120, and the touch sensor 130B and the display 120 form a touch panel, which is also referred to as a "touchscreen". The touch sensor 130B is configured to detect a touch operation performed on or near the touch sensor 130B. The touch sensor can transmit a detected touch operation to the application processor to determine a type of a touch event. The display 120 may be configured to provide a visual output related to the touch operation. In some other embodiments, the touch sensor 130B may alternatively be disposed on a surface of the electronic device, which is different from the position of the display 120.

The external memory interface 140 may be configured to connect to an external memory card such as a Micro SD card, so as to expand a storage capacity of the electronic device. The external memory card communicates with the processor 110 by using the external storage interface 140, so as to implement a data storage function. For example, music, video, and other files are stored in the external memory card.

The internal memory 141 may be configured to store computer executable program code. The executable program code may include an operating system, an application required by at least one function (for example, a sound play function or an image play function), and the like. The executable program code includes an instruction. The processor 110 runs the instruction stored in the internal memory 141, so that the electronic device performs various function applications and data processing. For example, in this embodiment, the processor 110 executes the instruction in the internal memory 141, so that the electronic device performs the light spot display method provided in the embodiments of this application.

The internal memory 141 may include a program storage area and a data storage area. The data storage area may store data (such as audio data or a phone book) created during use of the electronic device. The storage program area may be used to store program code executable by a computer. In addition, the internal memory 141 may include a high-speed random access memory, and may further include a non-volatile memory, such as at least one magnetic disk storage device, a flash memory device, or a universal flash storage (UFS).

In addition, an operating system runs on the foregoing components, for example, an Android open source operating system, a Windows operating system, or an iOS operating system. An application can be installed and run on the operating system.

A software system of the electronic device may use a layered architecture, an event-driven architecture, a micro-kernel architecture, a micro-service architecture, or a cloud architecture. In this embodiment of this application, an android system with a hierarchical architecture is used as an example to describe a software architecture of an electronic device.

Figure 4:
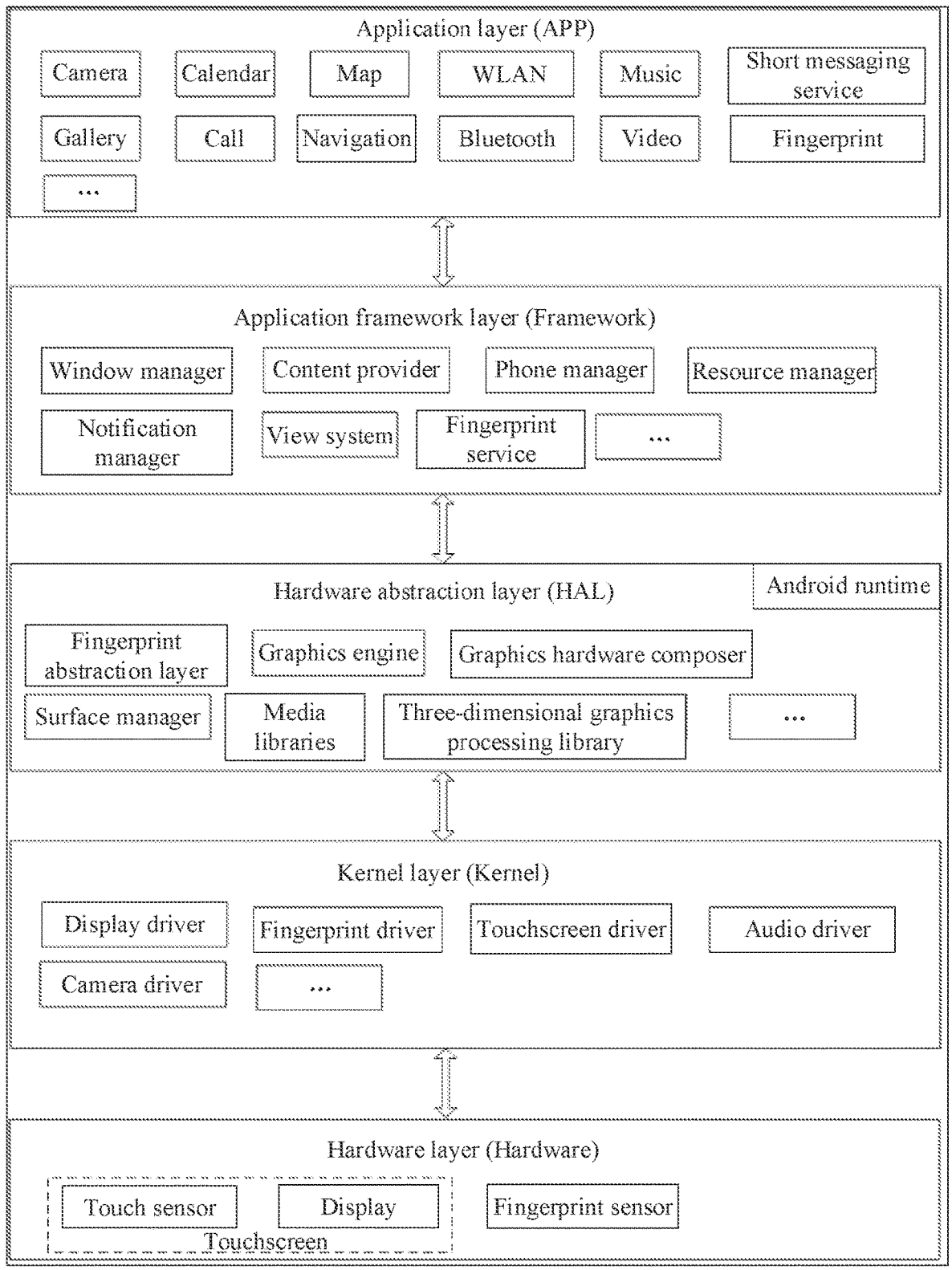
FIG. 4 is a block diagram of a software architecture of an electronic device according to an embodiment of this application.

FIG. 4 is a block diagram of a software architecture of an electronic device according to an embodiment of this application.

The layered architecture divides software into several layers, and each layer has a clear role and division of labor. The layers communicate with each other through software interfaces. The Android system is used as an example. In some embodiments, the Android system is divided into four layers: an application layer (application, APP), an application framework layer (Framework), a hardware abstraction layer (HAL), and a kernel layer (Kernel).

The application layer may include a series of application packages. In this embodiment of this application, the application package may include an application related to fingerprint recognition, such as fingerprint recognition. For example, fingerprint recognition can be used to implement fingerprint unlock, application access lock, fingerprint-based photographing, and fingerprint-based incoming call answering. Optionally, as shown in FIG. 4, the application package may include applications such as camera, gallery, calendar, call, map, navigation, WLAN, Bluetooth, music, video, and short messaging service.

The application framework layer (Framework) provides an application programming interface (API) and a programming framework for applications at the application layer. The application framework layer includes some predefined functions. In this embodiment of this application, as shown in FIG. 4, the application framework layer may include a fingerprint service (FP service). The application framework layer may provide an API related to a fingerprint recognition function for a fingerprint recognition application at the application layer, and provide a fingerprint service for the fingerprint recognition application, so as to implement a fingerprint recognition function. Optionally, as shown in FIG. 4, the application framework layer may further include: a window manager, a content provider, a view system, a phone manager, a resource manager, a notification manager, and the like.

The hardware abstraction layer (HAL), or referred to as Android Runtime, is responsible for scheduling and management of the Android system. It includes a core library and a virtual machine.

The core library includes two parts: one part is functions that need to be invoked by a java language, and the other part is the core library of Android.

The application layer and the application framework layer run in a virtual machine. The virtual machine executes java files at the application layer and the application framework layer as binary files. The virtual machine is configured to implement functions such as object lifecycle management, stack management, thread management, security and exception management, and recycling of waste.

A system library may include a plurality of functional modules, for example, a fingerprint abstraction layer (fingerprint HAL), a graphics engine (surface flinger), and a graphics hardware composer (hardware composer).

The fingerprint abstraction layer is used to report a fingerprint event to the fingerprint service at the application framework layer.

The graphics engine is an engine for drawing graphics. For example, in this embodiment of this application, the graphics engine is configured to draw; at a logic display layer, a layer used to display a light spot.

The graphics hardware composer is a driver abstraction layer of a dedicated chip for layer compositing. For example, in this embodiment of this application, the graphics hardware composer is configured to connect a graphics engine and a display driver, that is, the graphics hardware composer is a communication bridge between the graphics engine and the display driver, so that a layer drawn by the graphics engine is transmitted to the display driver for display.

Optionally, the system library may further include a surface manager, media libraries, three-dimensional (3D) graphics processing libraries (for example, OpenGL ES), and the like.

The surface manager is configured to manage a display subsystem, and provide fusion of 2D and 3D layers for a plurality of applications. The three-dimensional graphics processing library is configured to achieve three-dimensional graphics drawing, image rendering, compositing, and layer processing.

The kernel layer is a layer between hardware and software. In this embodiment of this application, the kernel layer includes at least a display driver and a sensor driver. The sensor driver includes a touch sensor driver, which is also referred to as a touch panel driver, and a fingerprint sensor driver, which is also referred to as a fingerprint driver. Optionally, the kernel layer may further include a camera driver, an audio driver, and the like.

The driver module at the kernel layer is used to obtain data reported by one or more sensors at the hardware layer (Hardware), process the data, and report a processing result to the hardware abstraction layer.

In this embodiment of this application, the hardware layer may include hardware modules such as a sensor module and a display. In this embodiment of this application, the sensor module includes at least a touch sensor and a fingerprint recognition sensor.

It should be noted that although the Android system is used as an example for description in this embodiment of this application, the basic principle is also applicable to electronic devices based on another operating system such as iOS or Windows.

Figure 5:
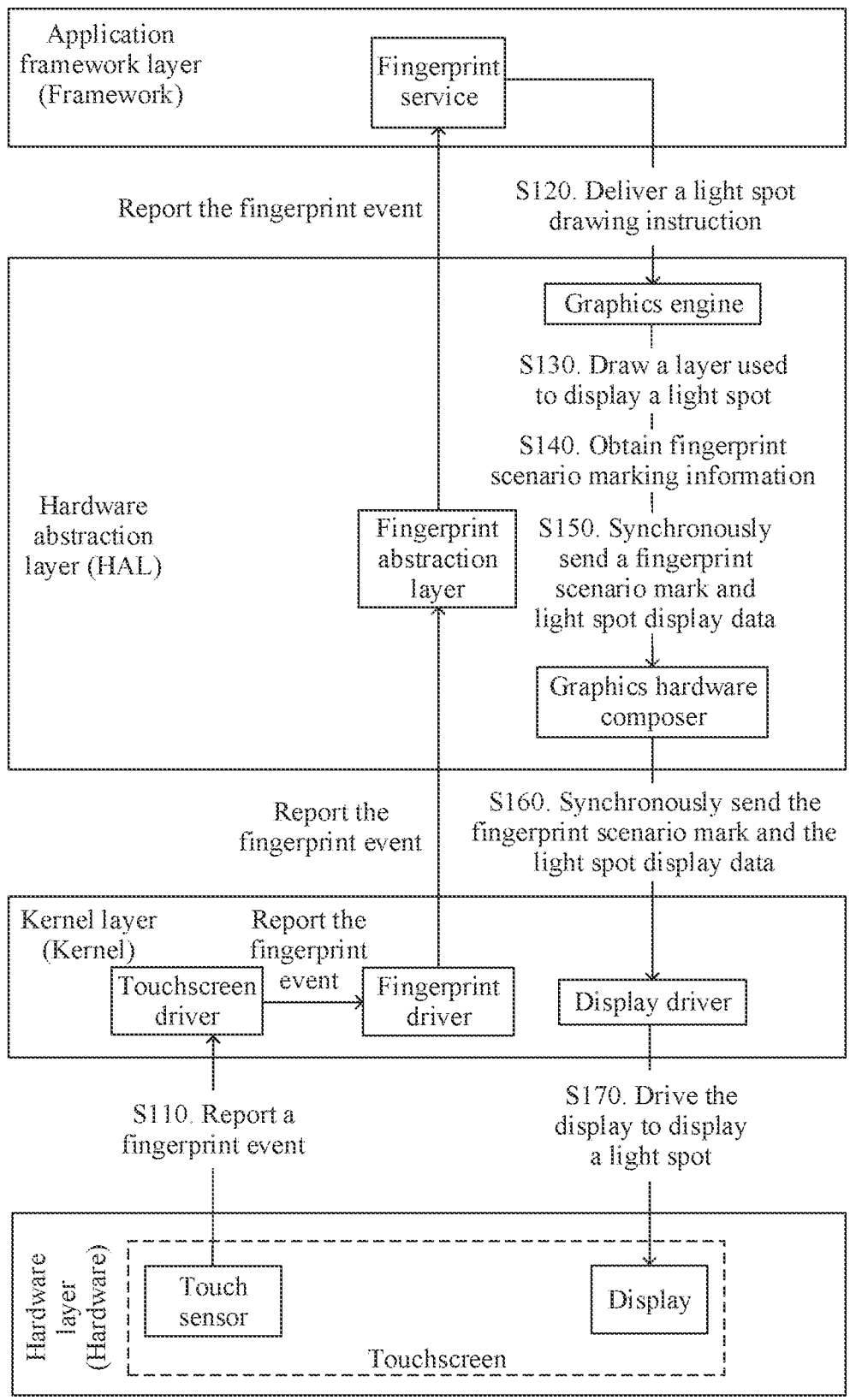
FIG. 5 is a schematic flowchart of a light spot display method according to an embodiment of this application.

The following describes in detail the light spot display method provided in this embodiment of this application with reference to FIG. 5. As shown in FIG. 5, the light spot display method may include the following steps:

S110. After detecting a touch operation in the fingerprint detection area, the touch sensor generates a fingerprint event, and reports the fingerprint event to a fingerprint service layer by layer.

When a finger presses the fingerprint detection area on a touchscreen, after detecting the touch operation, the touch sensor generates the fingerprint event, and reports the event to the fingerprint service layer by layer.

As shown in FIG. 5, a path for reporting the fingerprint event layer by layer is as follows: The touch sensor reports the fingerprint event to a touchscreen driver, the touchscreen driver transmits the fingerprint event to a fingerprint driver, the fingerprint driver reports the fingerprint event to a fingerprint abstraction layer (fingerprint HAL), and the fingerprint abstraction layer reports the fingerprint event to the fingerprint service.

S120. After receiving the fingerprint event, the fingerprint service generates a light spot drawing instruction, and delivers the light spot drawing instruction to a graphics engine.

After receiving the fingerprint event, the fingerprint service processes light spot display logic, that is, generates the light spot drawing instruction, and sends the light spot drawing instruction to the graphics engine (surface flinger). The light spot drawing instruction is used to trigger the graphics engine to create a layer used to display a light spot. The graphics engine is a two-dimensional graphics engine shown in FIG. 4.

S130. The graphics engine responds to the light spot drawing instruction, and creates, based on the obtained light spot data, the layer used to display a light spot, and obtains light spot display data.

In an example embodiment, data required for drawing a light spot is initialized in the graphics engine, which may be referred to as light spot data. After receiving the light spot drawing instruction delivered by the fingerprint service, the image engine reads and parses the light spot data, and draws the light spot based on the parsed light spot data to obtain the light spot display data. The light spot data is raw data used to draw a light spot. The light spot display data is display content obtained by the graphics engine through drawing based on the light spot data, that is, result data obtained after the layer used to display a light spot is drawn. The display driver may display the light spot based on the light spot display data. For example, a radius of a light spot in the light spot data is set to 5 mm, and a color is white. The graphics engine needs to parse 5 mm into a corresponding quantity of pixels, and parse a color of the light spot into a corresponding RGB color value.

In a possible implementation, the layer used to display a light spot includes a light spot layer and a mask layer.

The light spot layer is used to transmit light emitted by the display, so as to provide a light source for the fingerprint sensor to obtain a fingerprint image. The mask layer is used to shield the light emitted from the display, so as to avoid damage to human eyes caused by the bright light.

Figure 6:
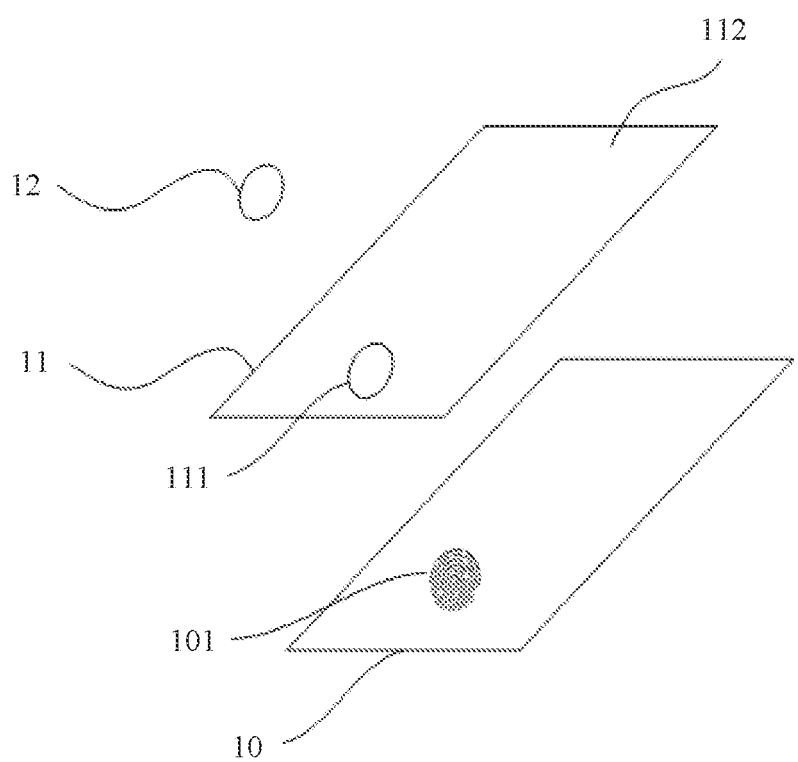
FIG. 6 is a schematic diagram of a mask layer and a light spot layer according to an embodiment of this application.

As shown in FIG. 6, the drawn light spot includes the mask layer 11 and the light spot layer 12, and the light spot layer 12 is located in the fingerprint detection area 101 of the display 10, so that when the finger presses the fingerprint detection area 101, the light spot can be displayed in this area to provide a light source for fingerprint recognition.

The mask layer 11 is used to cover another area on the display 10 except the light spot layer 11.

The mask layer 11 includes a hollow area 111 and a non-hollow area 112. The light spot layer 12 is inlaid in the hollow area 111, and the light spot layer 12 can completely cover the hollow area 111 of the mask layer.

Correspondingly, the light spot display data includes mask layer data and light spot layer data, and the light spot layer data includes information such as a position, a color, a shape, and a size of the light spot layer. The mask layer data includes a shape, a position, and a size of a hollow area, and a color of the non-hollow area. The position, shape, and size of the hollow area are the same as those of the light spot layer, that is, it is ensured that the light spot layer completely covers the hollow area of the mask layer.

For example, the light spot layer may be white or another near-white color, so as to transmit light. The non-hollow area of the mask layer may be black or another near-black color, so as to shield light.

In addition, an area of the light spot layer and an area of the fingerprint detection area may be the same or different. A shape of the light spot may be set according to an actual requirement. Considering that a fingerprint of a finger is generally elliptical, for example, the shape of the light spot area may be a circle, an ellipse, a ring, or another shape, this is not specifically limited in this application.

S140. The graphics engine obtains fingerprint scenario marking information.

The fingerprint scenario marking information is used to indicate that a current display scenario is a fingerprint recognition scenario. In the fingerprint recognition scenario, a display driver controls a display to enter a high brightness mode. In the high brightness mode, all display areas of the display are illuminated with a specific brightness, that is, the entire display is illuminated with a specific brightness. For example, the brightness in the high brightness mode reaches 1000 nits, where nit is the unit of brightness, and 1 nit represents the luminous intensity per unit area, which refers to the intensity of the reflected light from an object seen by an eye from a certain direction.

In a possible implementation, a parameter that represents the fingerprint scenario marking information is set in the graphics engine of an operating system.

For example, the fingerprint scenario marking information is a marking parameter, and the marking parameter is used as an initialization parameter in code of the graphics engine. After the graphics engine receives the light spot drawing instruction, the marking parameter is assigned to a value representing that the current display scenario is a fingerprint scenario. For example, when the marking parameter is assigned with a value of "1", it indicates that the current display scenario is a fingerprint recognition scenario. In a non-fingerprint recognition scenario, the marking parameter is assigned with a value of "0".

For example, the fingerprint scenario marking parameter may be set to Fingerprintflag in the code of the graphics engine. If Fingerprintflag=1, it indicates that the current display scenario is a fingerprint recognition scenario. If Fingerprintflag=0 it indicates that the current display scenario is not a fingerprint recognition scenario. Certainly, the fingerprint scenario marking information may alternatively be other information used for marking.

In another possible implementation, the fingerprint scenario marking information and the light spot data may alternatively be stored in another place that can be read by the graphics engine. For example, the two pieces of data may be maintained in a database, and may be directly read from the database when needed. This application sets no special limitation thereto.

The graphics engine may obtain the fingerprint scenario marking information after receiving the light spot drawing instruction, or may obtain the fingerprint scenario marking information after drawing the light spot.

S150. The graphics engine synchronously sends the fingerprint scenario marking information and the light spot display data to a graphics hardware composer.

The graphics engine simultaneously sends the light spot display data and the fingerprint scenario marking information to the graphics hardware composer, so as to ensure that the graphics hardware composer synchronously receives the two pieces of data. The reason is that the two pieces of data are sent at the same time, and the two pieces of data pass through the same path, that is, the two pieces of data are sent from the graphics engine to the graphics hardware composer without passing through another node. Therefore, transmission time of the two pieces of data is the same, and finally, it is ensured that a receive end (that is, the graphics hardware composer) can receive the two pieces of data at the same time.

In a possible implementation, the graphics engine may write the light spot display data and the fingerprint scenario marking information into a same sending queue, and send the data in the queue to the graphics hardware composer. For data in the same sending queue, the difference in sending time is very short, which is several microseconds at most. Therefore, the time difference can be ignored, that is, the data in the same sending queue is considered to be sent at the same time. In addition, it takes a same time for the two pieces of data to be transmitted from the graphics engine to the graphics hardware composer, that is, it is considered that the graphics hardware composer simultaneously receives the fingerprint scenario marking information and the light spot display data.

The transmission path in this embodiment of this application refers to the transmission of data between two modules by using a software interface. For example, the graphics engine may directly transmit data to the graphics hardware composer without passing through another module. Therefore, a transmission path from the graphics engine to the graphics hardware composer may include a communication connection from any software interface of the graphics engine to any software interface of the graphics hardware composer, which may be referred to as a software interface connection. It can be learned that the transmission path may include at least one software interface connection from the graphics engine to the graphics hardware composer.

For example, the graphics engine separately sends the light spot display data and the fingerprint scenario marking information to the graphics hardware composer by using different software interface connections. For example, the light spot display data is sent to the graphics hardware composer by using a software interface connection A, and the fingerprint scenario marking information is sent to the graphics hardware composer by using a software interface connection B. In addition, it takes a same time for different software interface connections between the two software modules to transmit data, that is, it takes a same time for the software interface connection A and the software interface connection B to transmit data. Therefore, provided that the graphics engine simultaneously sends the light spot display data and the fingerprint scenario marking information, it can be ensured that the graphics hardware composer can simultaneously receive the two pieces of data.

In a possible implementation, the foregoing transmission path may be an original software interface connection between the graphics engine and the graphics hardware composer. For example, the fingerprint scenario marking information and the light spot display data are transmitted by using a software interface connection that is used to transmit the light spot display data only, thereby saving software interface resources of the graphics engine and the graphics hardware composer. Alternatively, the transmission path may reuse a software interface connection for another type of data, that is, the software interface communication connection may be used to transmit the another type of data, and may be used to transmit the light spot display data and the fingerprint scenario marking information.

Certainly, in another embodiment, a new software interface connection may be enabled between the graphics engine and the graphics hardware composer. The software interface connection may be used to specifically transmit the fingerprint scenario marking information and the light spot display data. This is not specifically limited in this application.

S160. The graphics hardware composer synchronously sends the fingerprint scenario marking information and the light spot display data to the display driver.

The graphics hardware composer is a driver abstraction layer of a layer composer chip, and is configured to connect the graphics engine and the display driver. That is, data sent by the graphics engine needs to be sent to the display driver by using the graphics hardware composer.

In an example embodiment, after receiving the fingerprint scenario marking information and the light spot display data that are sent by the graphics engine, the graphics hardware composer synchronously sends the two pieces of data to the display driver.

For example, the graphics hardware composer may write the fingerprint scenario marking information and the light spot display data into a same sending queue, and send the data in the sending queue. As described above, the difference between the sending times of different data in the same sending queue is very short and can be ignored, that is, it is considered that the data in the same sending queue is simultaneously sent, and it takes a same time for the two pieces of data to be transmitted through the same transmission path. Therefore, a receiver (that is, the display driver) of the transmission path can receive the fingerprint scenario marking information and the light spot display data at the same time.

In a possible implementation, the fingerprint scenario marking information and the light spot display data are sent to the display driver synchronously through an existing software interface connection between the graphics hardware composer and the display driver, thereby saving software interface resources of the graphics hardware composer and the display driver.

Certainly, in another embodiment, a new software interface connection may be enabled between the graphics hardware composer and the display driver. The software interface connection may be used to specifically transmit the fingerprint scenario marking information and the light spot display data. This is not specifically limited in this application.

It may be learned from the foregoing S140 and S150 that in this embodiment, a transmission path of the light spot display data and the fingerprint scenario marking information is: the graphics engine→the graphics hardware composer→the display driver. In other embodiments, a path for synchronously transmitting the light spot display data and the fingerprint scenario marking information may be another path, for example: the graphics engine→the display driver.

S170. After the display driver synchronously receives the fingerprint scenario marking information and the light spot display data, the display driver drives the display to display the light spot.

After receiving the fingerprint scenario marking information and the light spot display data, the display driver controls, based on the fingerprint scenario marking information, the display to enter the high brightness display mode, and displays the light spot layer and the mask layer on the logic display layer based on the light spot display data, that is, implements display of the light spot layer and the mask layer on the display.

When the display is in the high brightness mode, light emitted by the display can be irradiated on a finger in the fingerprint detection area through the light spot layer, so as to provide a light source for the fingerprint sensor to obtain a fingerprint image. In addition, a non-hollow area of the mask layer can shield the bright light from the display.

For example, if the light spot layer is white, and the mask layer is black, when the display is in the high-brightness display mode, a display area in which the light spot layer is located is white, and other areas are black, that is, a bright white light spot is displayed on the display.

According to the light spot display method provided in this embodiment, after the touch operation in the fingerprint detection area is detected, the fingerprint event is generated and reported to the fingerprint service layer by layer. The fingerprint service generates the light spot drawing instruction and sends the light spot drawing instruction to the graphics engine in the system. The graphics engine obtains the light spot display data and the fingerprint scenario marking information, and synchronously sends the fingerprint scenario marking information and the light spot display data to the graphics hardware composer. Further, the graphics hardware composer synchronously sends the two pieces of data to the display driver, so as to ensure that the display driver can synchronously receive the fingerprint scenario marking information and the light spot display data. The display driver controls the entire display to enter the high brightness mode based on the fingerprint scenario marking information, and displays the light spot layer and the mask layer based on the light spot display data, where the light spot layer allows the bright light to pass through, and the mask layer shields the bright light from another area of the display, so as to finally display a bright light spot on the display. This solution avoids the problem that the light spot display process takes a long time because the fingerprint scenario marking information and the light spot display data are not synchronously received. Therefore, this solution reduces the time consumed in the light spot display process, that is, increases the light spot display speed. In addition, the fingerprint image can be obtained and the fingerprint can be recognized only after the light spot is normally displayed. Therefore, this solution increases the speed of responding to a fingerprint event, and then reduces the time consumed in the entire fingerprint recognition process.

Further, in this solution, the existing software interface connection in the transmission path "the graphics engine→the graphics hardware composer→the display driver" may be used to synchronously transmit the fingerprint scenario marking information and the light spot display data. Therefore, software interface resources of the system are saved. In addition, a quantity of software interfaces in the system is reduced, and therefore, interface complexity of the system is reduced.

Figure 7:
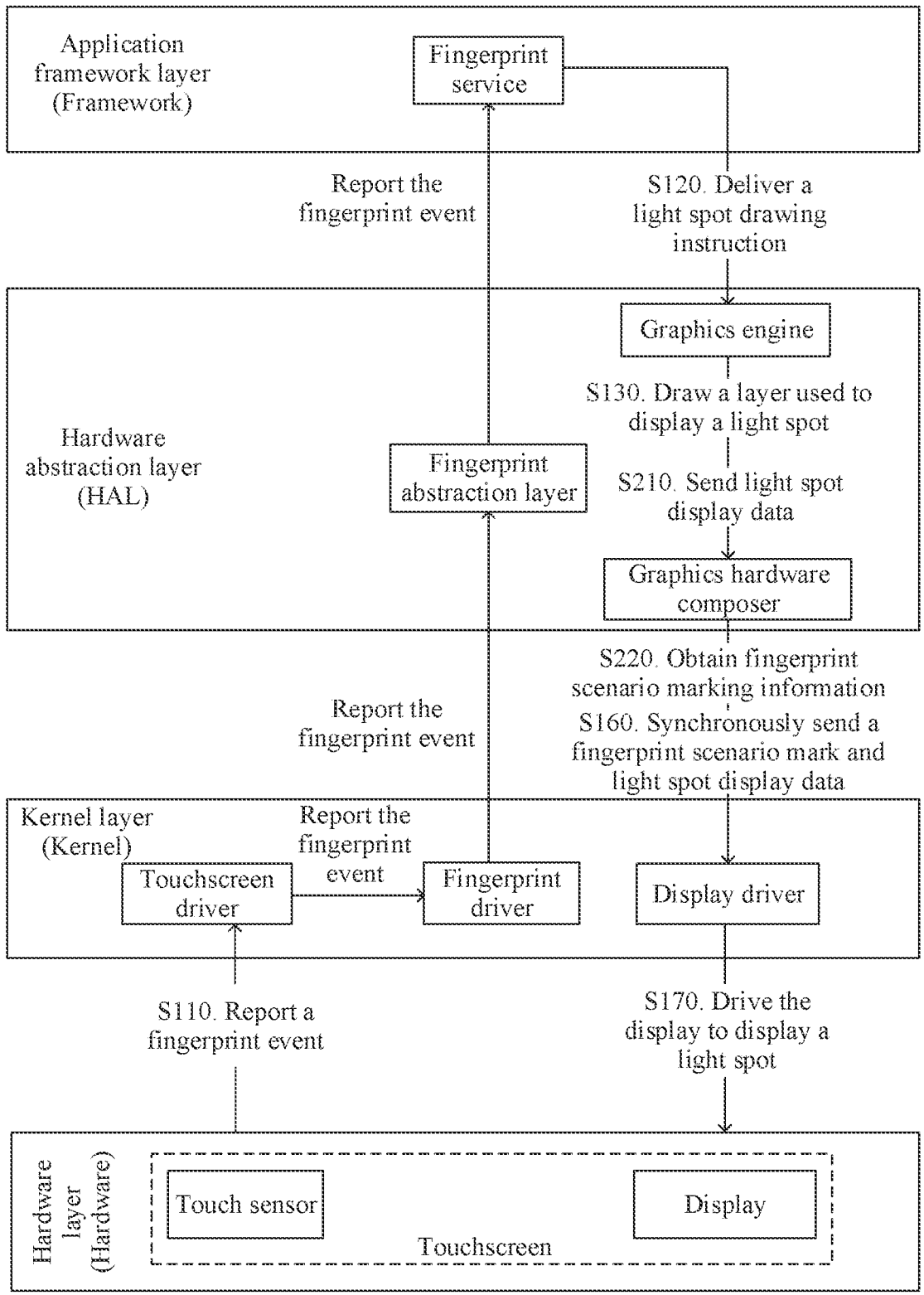
FIG. 7 is a schematic flowchart of another light spot display method according to an embodiment of this application.

FIG. 7 is a schematic flowchart of another light spot display method according to an embodiment of this application. A difference between this embodiment and the embodiment shown in FIG. 5 is as follows: In this embodiment, a transmission path of fingerprint scenario marking information and light spot display data is a graphics hardware composer→a display driver. A graphics engine transmits the light spot display data to the graphics hardware composer, and then the graphics hardware composer synchronously sends the fingerprint scenario marking information and the light spot display data to the display driver.

As shown in FIG. 7, this embodiment is the same as S110 to S130 and S160 in the embodiment shown in FIG. 5. Details are not described herein again. The following describes only steps different from those in the embodiment shown in FIG. 5.

S210. The graphics engine sends the light spot display data to the graphics hardware composer.

After drawing a light spot, the graphics engine transmits the light spot display data by using an existing software interface between the graphics engine and the graphics hardware composer.

S220. After receiving the light spot display data, the graphics hardware composer obtains the fingerprint scenario marking information.

In this embodiment, a process in which the graphics hardware composer obtains the fingerprint scenario marking information is similar to the process in which the graphics engine obtains the fingerprint scenario marking information in the embodiment shown in FIG. 5.

For example, the initialization parameter of the graphics hardware composer includes a fingerprint scenario marking parameter. After receiving the light spot display data, the graphics hardware composer determines that the current display scenario is a fingerprint scenario, and sets the fingerprint scenario marking parameter to a value corresponding to the fingerprint scenario, for example, a binary value "1". Alternatively, the fingerprint scenario marking information may be stored as data information in a place that can be read by the graphics hardware composer. For example, the fingerprint scenario marking information is maintained in the database, and after receiving the light spot display data, the graphics hardware composer reads the fingerprint scenario marking information from the database.

After obtaining the fingerprint scenario marking information, the graphics hardware composer performs step S160: The graphics hardware composer synchronously sends the fingerprint scenario marking information and the light spot display data to the display driver. Details are not described herein again.

According to the light spot display method provided in this embodiment, after receiving the light spot display data sent by the graphics engine, the graphics hardware composer determines that the current display scenario is a fingerprint scenario, and synchronously sends the fingerprint scenario marking information and the light spot display data to the display driver, so as to ensure that the display driver synchronously receives the fingerprint scenario marking information and the light spot display data. In this solution, the graphics engine needs to send only the light spot display data to the graphics hardware compositor, and does not need to send the fingerprint scenario marking information. Therefore, processing logic of the graphics engine for responding to the light spot drawing instruction is simplified, thereby reducing complexity of the graphics engine.

Figure 8:
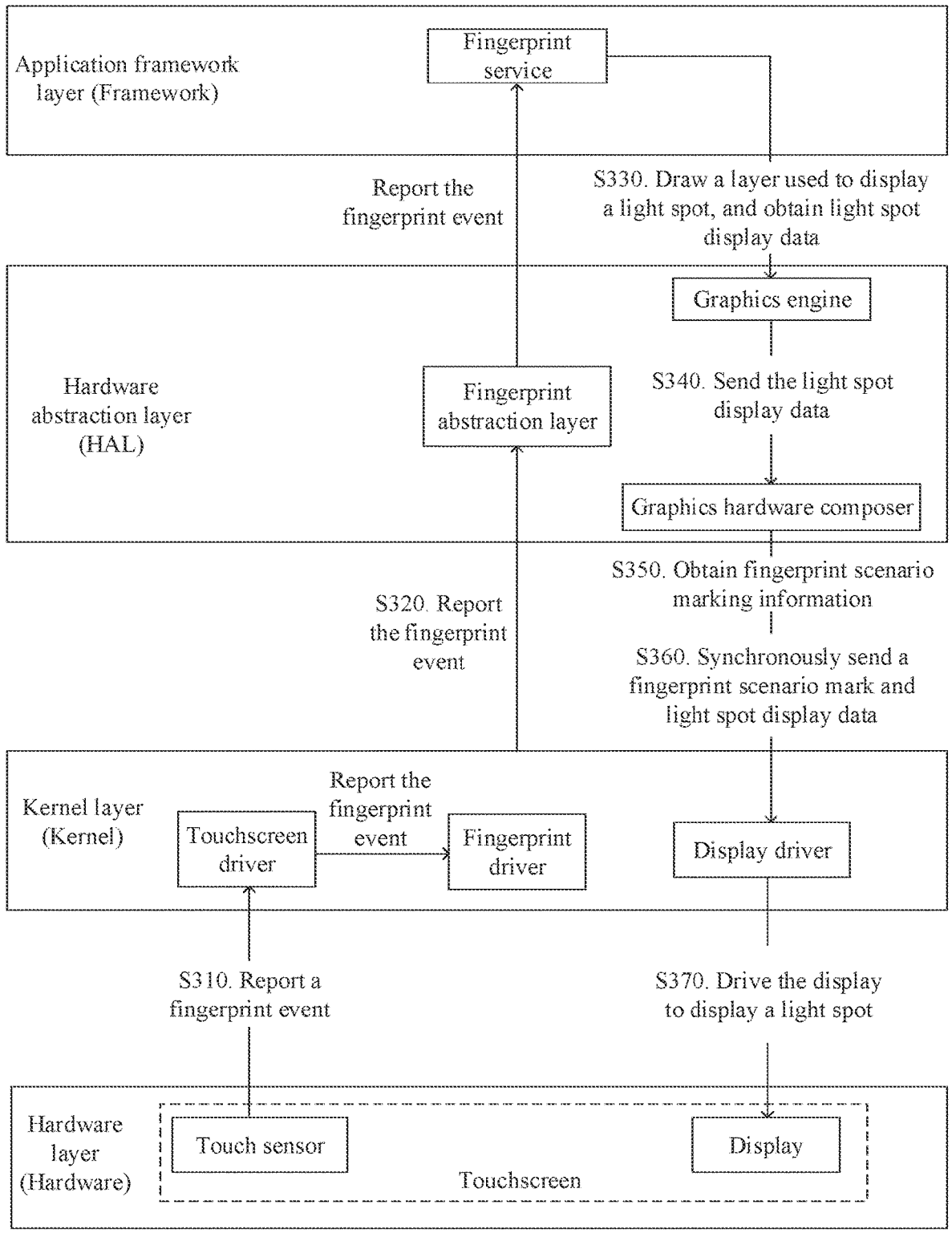
FIG. 8 is a schematic flowchart of still another light spot display method according to an embodiment of this application.

In another example embodiment of this application, a fingerprint service may draw a layer used to display a light spot, and send the layer to a graphics engine for subsequent processing. As shown in FIG. 8, the light spot display method provided in this embodiment may include the following steps:

S310. After detecting a touch operation in the fingerprint detection area, a touch sensor generates a fingerprint event, and transmits the fingerprint event to a fingerprint driver.

S320. The fingerprint driver reports the fingerprint event to the fingerprint service layer by layer.

As shown in FIG. 8, a transmission path of the fingerprint event is as follows: the touch sensor→a touchscreen driver→the fingerprint driver→a fingerprint abstraction layer→the fingerprint service.

S330. The fingerprint service responds to the fingerprint event to obtain light spot data, and draws, based on the light spot data, a layer used to display a light spot, obtains light spot display data, and transmits the light spot display data to the graphics engine.

The light spot data is raw data used to draw a light spot (that is, draw a layer used to display a light spot), for example, may include a position, a size, a shape, and a color of the light spot. The light spot display data is display content obtained through drawing based on the light spot data, that is, result data obtained after the light spot is drawn. For example, a radius of a light spot in the light spot data is set to 5 mm, a color is white, while a radius of a light spot in the light spot display data is a quantity of pixels corresponding to 5 mm, and a color of the light spot is an RGB color value corresponding to white.

In an example embodiment, the light spot data may be preset in the fingerprint driver, and the fingerprint abstraction layer may read the light spot data by invoking an interface of the fingerprint driver. Further, the fingerprint service may read the light spot display data from the fingerprint abstraction layer by invoking an interface at the fingerprint abstraction layer.

In an example embodiment, a fingerprint event processing method is set in the fingerprint service. After receiving the fingerprint event, the fingerprint service performs the fingerprint event processing method, that is, reads light spot data from a fingerprint abstraction layer, draws, based on the light spot data, a layer used to display a light spot, that is, a light spot layer and a mask layer, and obtains the light spot display data. Further, the fingerprint service sends the light spot display data to the graphics engine.

In another example embodiment, after receiving the fingerprint event, the fingerprint service generates a light spot drawing instruction, and then the fingerprint service responds to the light spot display instruction to execute the foregoing light spot drawing logic.

The light spot layer and the mask layer in this embodiment are the same as the light spot layer and the mask layer in the embodiment shown in FIG. 5. Details are not described herein again.

S340. The graphics engine sends light spot display data and a fingerprint scenario mark setting instruction to the graphics hardware composer.

After detecting that the light spot display data includes the light spot layer and the mask layer, the graphics engine fuses the light spot layer and the mask layer, that is, superimposes the light spot layer and the mask layer.

In addition, after detecting that the received light spot display data includes the mask layer, the graphics engine sends the fingerprint scenario mark setting instruction to the graphics hardware composer, where the instruction is used to enable the graphics hardware composer to set the fingerprint scenario marking information to information that represents the current display scenario as a fingerprint scenario.

For example, the graphics engine transmits the light spot display data and the fingerprint scenario mark setting instruction to the graphics hardware composer by invoking an interface of the graphics hardware composer.

The invoked interface of the graphics hardware composer may be an original software interface of the graphics hardware composer, for example, a software interface used to transmit other information. Alternatively, the interface may be a newly created software interface for the graphics hardware composer, and the newly created software interface may be a dedicated interface for the light spot display data and the fingerprint scenario mark setting instruction.

S350. The graphics hardware composer sets the fingerprint scenario marking information in response to the fingerprint scenario mark setting instruction.

In an example embodiment, a processing method that matches the fingerprint scenario marking instruction is set in the graphics hardware composer. After receiving the fingerprint scenario mark setting instruction, the graphics hardware composer performs the processing method, that is, sets the fingerprint scenario marking information to information indicating that the current display scenario is a fingerprint scenario. For example, the fingerprint scenario marking information is a marking parameter, and the marking parameter is set to a binary number "1" to indicate that the current display scenario is a fingerprint scenario.

S360. The graphics hardware composer synchronously sends the fingerprint scenario marking information and the light spot display data to the display driver.

The graphics hardware composer may invoke an interface of the display driver to synchronously transmit the fingerprint scenario marking information and the light spot display data to the display driver.

A process of synchronously sending the fingerprint scenario marking information and the light spot display data in this embodiment is the same as the process of synchronously sending the fingerprint scenario marking information and the light spot display data in the embodiment shown in FIG. 6. Details are not described herein again.

S370. The display driver drives, based on the fingerprint scenario marking information and the light spot display data, the display to display the light spot.

In this embodiment, a process in which the display driver drives, based on the fingerprint scenario marking information and the light spot display data, the display to display the light spot is the same as the process in S170 in the embodiment shown in FIG. 5. Details are not described herein again.

According to the light spot display method provided in this embodiment, after receiving the fingerprint event, the fingerprint service draws the light spot, and sends the light spot display data obtained by drawing the light spot to a graphics engine: then the graphics engine sends the light spot display data and the fingerprint scenario mark setting instruction to the graphics hardware composer: and the graphics hardware composer obtains, in response to the fingerprint scenario mark setting instruction, the fingerprint scenario marking information that is used to represent the current display scenario as a fingerprint scenario, and then synchronously sends the light spot display data and the fingerprint scenario marking information to the display driver, thereby finally ensuring that the display driver synchronously receives the light spot display data and the fingerprint scenario marking information. In this solution, the fingerprint service draws the light spot based on the light spot data, and the graphics engine only superimposes the light spot layer and the mask layer, thereby further reducing complexity of the graphics engine.

It may be learned from the foregoing content that, according to the light spot display method provided in this application, the fingerprint scenario marking information and the light spot display data are synchronously sent, so as to ensure that the display driver synchronously receives the two pieces of data, and then control, based on the two pieces of data, the display to display the light spot normally. The foregoing light spot display method embodiment is described by using an Android system as an example, and a limitation should not be imposed on the light spot display method. The light spot display method provided in this application is also applicable to an electronic device based on another operating system such as iOS or Windows. A person skilled in the art may adaptively modify the light spot display method of this application based on a design idea of this application and according to application requirements of different operating systems, for example, system frameworks of different operating systems and different light spot display logic, to achieve a same technical effect as the light spot display method of this application. For example, in another operating system, a graphics engine process may be performed by a module that has a same function as the graphics engine. For another example, in another operating system, a module that has a same function as the graphics hardware composer may execute a process of the graphics hardware composer. Alternatively, a process of the light spot display method in this application is adaptively modified based on specific functions of different functional modules in another operating system, which is not listed one by one herein.

In the embodiments of this application, the foregoing electronic device may be divided into functional modules based on the foregoing method examples. For example, each functional module may be obtained through division for a corresponding function, or two or more functions may be integrated into one processing module. The foregoing integrated module may be implemented in a form of hardware, or may be implemented in a form of a software functional module. It should be noted that the module division in this embodiment of this application is an example and is merely logical function division, and there may be another division manner during actual implementation.

Figure 9:
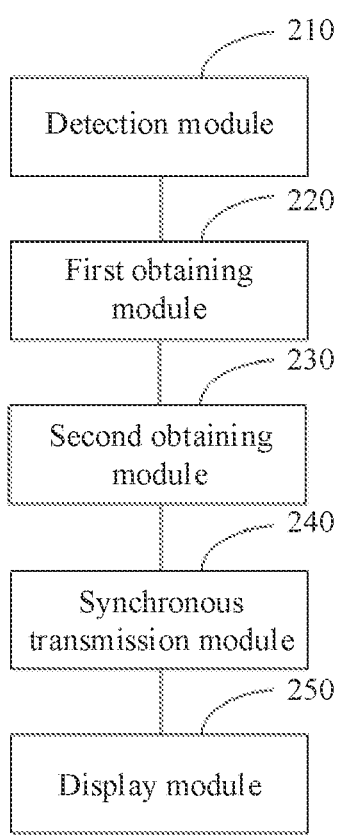
FIG. 9 is a schematic diagram of a structure of a light spot display apparatus according to an embodiment of this application.

When functional modules are divided based on corresponding functions, FIG. 9 is a possible schematic diagram of composition of the light spot display apparatus in the foregoing embodiment. The light spot display apparatus can perform steps of any one of the method embodiments of this application. The light spot display apparatus is an electronic device or a communication apparatus that supports the electronic device in implementing the method provided in the embodiments, for example, the communication apparatus may be a chip system.

As shown in FIG. 9, the light spot display apparatus may include: a detection module 210, a first obtaining module 220, a second obtaining module 230, a synchronous transmission module 240, and a display module 250.

The detection module 210 is configured to detect a touch operation in a fingerprint detection area to generate a light spot drawing instruction.

The first obtaining module 220 is configured to obtain light spot display data in response to the light spot drawing instruction, where the light spot display data is display content data obtained by drawing a layer used to display a light spot.

The second obtaining module 230 is configured to obtain fingerprint scenario marking information.

The synchronous transmission module 240 is configured to synchronously transmit the light spot display data and the fingerprint scenario marking information.

The display module 250 is configured to display a light spot based on the fingerprint scenario marking information and the light spot display data.

It should be noted that all related content of the steps in the foregoing method embodiment may be cited in function descriptions of corresponding functional modules, and details are not described herein again.

The light spot display apparatus provided in this embodiment of this application is configured to perform the light spot display method in any one of the foregoing embodiments, so that a same effect as that of the light spot display method in the foregoing embodiments can be achieved.

An embodiment further provides a computer readable storage medium, where the computer readable storage medium includes an instruction, and when the instruction is run on an electronic device, the electronic device is enabled to perform the related method steps shown in FIG. 5, FIG. 7, or FIG. 8, so as to implement the light spot display method in the foregoing embodiment.

An embodiment further provides a computer program product that includes an instruction, where when the computer program product runs on an electronic device, the electronic device is enabled to perform related method steps in the method embodiment shown in FIG. 5. FIG. 7, or FIG. 8, so as to implement the light spot display method in the foregoing embodiment.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above. For the specific working processes of the system, apparatus and units described above, reference may be made to the corresponding processes in the above-mentioned method embodiments. Details are not described herein again.

In the several embodiments provided in this application, it should be understood that the disclosed light spot display method and the apparatus may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the purpose of the solutions in the embodiments.

In addition, functional units in each of the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such understanding, the technical solution of this embodiment which is essential or a part contributing to the existing technology or all or a part of the technical solution may be embodied in the form of a software product, and the computer software product is stored in a storage medium and includes several instructions for enabling a computer device (which may be a personal computer, a server or a network device) or the processor to perform all or some steps of the method according to each embodiment. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A light spot display method, applied to an electronic device, wherein the method comprises:
    detecting a touch operation in a fingerprint detection area to generate a light spot drawing instruction;
    obtaining light spot display data in response to the light spot drawing instruction, wherein the light spot display data is display content data obtained by drawing a layer used to display a light spot;
    obtaining fingerprint scenario marking information;
    synchronously transmitting the light spot display data and fingerprint scenario marking information; and
    displaying a light spot based on the fingerprint scenario marking information and the light spot display data.

2. The method according to claim 1, wherein the synchronously transmitting the light spot display data and the fingerprint scenario marking information comprises:
    simultaneously transmitting the fingerprint scenario marking information and the light spot display data through a same transmission path.

3. The method according to claim 2, wherein the simultaneously transmitting the fingerprint scenario marking information and the light spot display data through the same transmission path comprises:
    writing the fingerprint scenario marking information and the light spot display data into a same sending queue, and sending data written in the sending queue through the same transmission path.

4. The method according to claim 1,
    wherein the light spot display data comprises data of a light spot layer and data of a mask layer; and
    wherein the light spot layer can transmit light of a display, and the mask layer can shield the light of the display.

5. The method according to claim 4,
    wherein the data of the light spot layer comprises a position, a shape, a size, and a color of the light spot layer;
    wherein the data of the mask layer comprises data of a hollow area and data of a non-hollow area, the data of a hollow area comprises a position, a shape, and a size of the hollow area, and the data of a non-hollow area comprises a range and a color of the non-hollow area;

wherein the position, the shape, and the size of the hollow area are respectively the same as the position, the shape, and the size of the light spot layer; and wherein a total area of the non-hollow area and the light spot layer is the same as a display area of the display.

6. The method according to claim 1, wherein the fingerprint scenario marking information is used to control the display of the electronic device to enter a high brightness mode.

7. The method according to claim 1, wherein an operating system of the electronic device comprises a graphics engine and a display driver; and wherein the synchronously transmitting the light spot display data and the fingerprint scenario marking information comprises:

synchronously sending, by the graphics engine, the fingerprint scenario marking information and the light spot display data to the display driver.

8. The method according to claim 7, wherein the operating system further comprises a graphics hardware composer; and wherein the synchronously sending, by the graphics engine, the fingerprint scenario marking information and the light spot display data to the display driver comprises:

synchronously sending, by the graphics engine, the fingerprint scenario marking information and the light spot display data to the graphics hardware composer; and synchronously sending, by the graphics hardware composer, the fingerprint scenario marking information and the light spot display data to the display driver.

9. The method according to claim 8, wherein the synchronously sending, by the graphics engine, the fingerprint scenario marking information and the light spot display data to the graphics hardware composer comprises:

writing, by the graphics engine, the fingerprint scenario marking information and the light spot display data into a same sending queue, and sending data written in the sending queue to the graphics hardware composer.

10. The method according to claim 8, wherein the synchronously sending, by the graphics hardware composer, the fingerprint scenario marking information and the light spot display data to the display driver comprises:

writing, by the graphics hardware composer, the fingerprint scenario marking information and the light spot display data into a same sending queue, and sending the data in the sending queue to the display driver.

11. The method according to claim 1, wherein an operating system of the electronic device comprises a graphics engine, a graphics hardware composer, and a display driver;

wherein the obtaining the fingerprint scenario marking information comprises:

obtaining, by the graphics hardware composer, the fingerprint scenario marking information after receiving the light spot display data from the graphics engine; and wherein the synchronously transmitting the light spot display data and the fingerprint scenario marking information comprises:

synchronously sending, by the graphics hardware composer, the fingerprint scenario marking information and the light spot display data to the display driver.

12. The method according to claim 11, wherein the operating system further comprises a fingerprint service; and wherein the obtaining the light spot display data in response to the light spot drawing instruction comprises:

obtaining, by the fingerprint service, the light spot data in response to the light spot drawing instruction; and drawing, by the fingerprint service based on the light spot data, a layer used to display the light spot, obtaining the light spot display data, and sending the light spot display data to the graphics engine.

13. The method according to claim 12, wherein the light spot data is raw data used to draw the light spot.

14. The method according to claim 1, wherein a receive end of synchronously transmitting the light spot display data and the fingerprint scenario marking information receives the light spot display data and the fingerprint scenario marking information at the same time.

15. An electronic device, comprising:

a touchscreen;

one or more processors; and a memory configured to store program code, wherein the one or more processors are configured to run the program code, so that the electronic device performs a light spot display method comprising:

detecting a touch operation in a fingerprint detection area of the touchscreen to generate a light spot drawing instruction;

obtaining light spot display data in response to the light spot drawing instruction, wherein the light spot display data is display content data obtained by drawing a layer used to display a light spot;

obtaining fingerprint scenario marking information;

synchronously transmitting the light spot display data and fingerprint scenario marking information; and displaying a light spot based on the fingerprint scenario marking information and the light spot display data.

16. A non-transitory computer readable storage medium storing instructions that, when the run on an electronic device, the electronic device is enabled to perform a light spot display method comprising:

detecting a touch operation in a fingerprint detection area to generate a light spot drawing instruction;

obtaining light spot display data in response to the light spot drawing instruction, wherein the light spot display data is display content data obtained by drawing a layer used to display a light spot;

obtaining fingerprint scenario marking information;

synchronously transmitting the light spot display data and fingerprint scenario marking information; and displaying a light spot based on the fingerprint scenario marking information and the light spot display data.

* * * * *

UNITED STATES PATENT AND TRADEMARK OFFICE
CERTIFICATE OF CORRECTION

| | | |
|---|---|---|
| PATENT NO. | : 12,154,370 B2 | Page 1 of 1 |
| APPLICATION NO. | : 17/800820 | |
| DATED | : November 26, 2024 | |
| INVENTOR(S) | : Chuang Cui | |

It is certified that error appears in the above-identified patent and that said Letters Patent is hereby corrected as shown below:

On the Title Page

Item (86) §371 (c)(1), (2) Date: "Dec. 22, 2022" should read -- Aug. 18, 2022 --.

Signed and Sealed this
Thirty-first Day of December, 2024

Derrick Brent
*Acting Director of the United States Patent and Trademark Office*